United States Patent
Kawano (10) Patent No.: US 9,247,080 B2
(45) Date of Patent: Jan. 26, 2016

(54) INFORMATION PROCESSING APPARATUS FOR ACQUIRING A VARIATION REGION BETWEEN IMAGE DATA AND READ DATA

(71) Applicant: FUJI XEROX CO., LTD., Tokyo (JP)

(72) Inventor: Hiroyuki Kawano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/189,158

(22) Filed: Feb. 25, 2014

(65) Prior Publication Data

US 2015/0049354 A1    Feb. 19, 2015

(30) Foreign Application Priority Data

Aug. 16, 2013  (JP) ................................ 2013-169239

(51) Int. Cl.
*G06F 3/12* (2006.01)
*H04N 1/00* (2006.01)

(52) U.S. Cl.
CPC ....... *H04N 1/00336* (2013.01); *H04N 1/00331* (2013.01)

(58) Field of Classification Search
CPC .......... H04N 1/00002; H04N 1/00026; H04N 1/00029; H04N 1/00039; H04N 1/00045
See application file for complete search history.

(56) References Cited

U.S. PATENT DOCUMENTS

| | | | |
|---|---|---|---|
| 2002/0032744 A1 | 3/2002 | Magoshi et al. | |
| 2003/0174253 A1 | 9/2003 | Ito et al. | |
| 2008/0013848 A1* | 1/2008 | Wu | H04N 1/00002 382/254 |
| 2011/0013232 A1* | 1/2011 | Ashikaga | H04N 1/00002 358/452 |
| 2011/0052078 A1* | 3/2011 | Yamakawa | G06K 9/036 382/199 |
| 2012/0182571 A1* | 7/2012 | Wu | G06K 15/027 358/1.14 |
| 2012/0200886 A1* | 8/2012 | Yamaguchi | H04N 1/00015 358/1.15 |
| 2014/0092419 A1* | 4/2014 | Yamagishi | G06T 7/001 358/1.14 |

FOREIGN PATENT DOCUMENTS

| | | |
|---|---|---|
| JP | A-2002-102532 | 4/2002 |
| JP | A-2004-5484 | 1/2004 |
| JP | A-2007-310567 | 11/2007 |

* cited by examiner

*Primary Examiner* — Benjamin O Dulaney
(74) *Attorney, Agent, or Firm* — Oliff PLC (57) ABSTRACT

Provided is an information processing apparatus including a comparison unit that compares image data with read data obtained by reading a medium on which an image of the image data is formed, an acquisition unit that acquires a variation region that varies in plural image data items or in plural read data items, and an output unit that outputs a comparison result of the comparison unit such that the variation region is in an invisible state.

11 Claims, 10 Drawing Sheets

| REGION ID | UPPER LEFT X COORDINATE | UPPER LEFT Y COORDINATE | WIDTH | HEIGHT |
|---|---|---|---|---|
| | | | | |

INFORMATION PROCESSING APPARATUS FOR ACQUIRING A VARIATION REGION BETWEEN IMAGE DATA AND READ DATA

CROSS-REFERENCE TO RELATED APPLICATIONS

This application is based on and claims priority under 35 USC 119 from Japanese Patent Application No. 2013-169239 filed Aug. 16, 2013.

BACKGROUND

Technical Field

The present invention relates to an information processing apparatus, and a non-transitory computer readable medium storing an information processing program.

SUMMARY

According to an aspect of the invention, there is provided an information processing apparatus including:

a comparison unit that compares image data with read data obtained by reading a medium on which an image of the image data is formed;

an acquisition unit that acquires a variation region that varies in plural image data items or in plural read data items; and an output unit that outputs a comparison result of the comparison unit such that the variation region is in an invisible state.

BRIEF DESCRIPTION OF THE DRAWINGS

Exemplary embodiments of the present invention will be described in detail based on the following figures, wherein.

DETAILED DESCRIPTION

Figure 1:
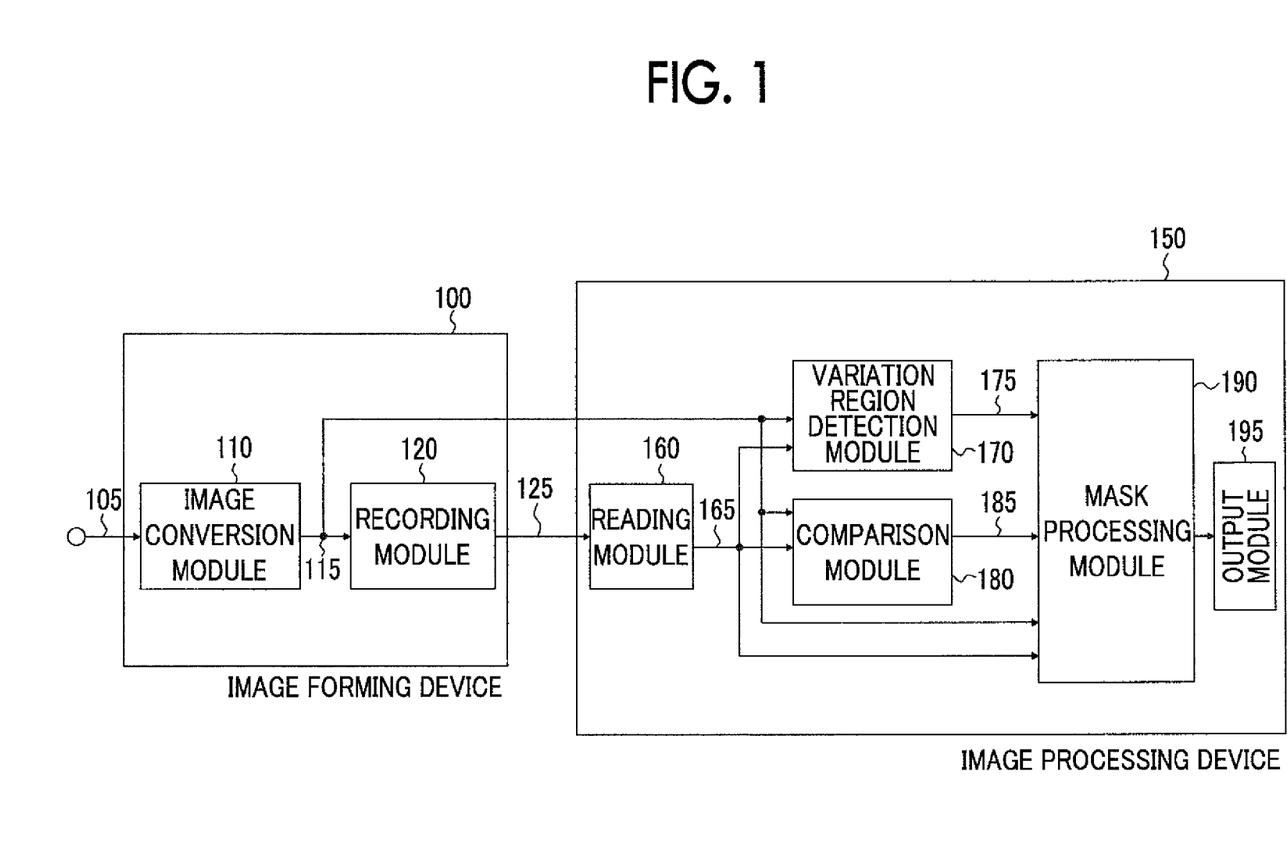
FIG. 1 is a conceptual module configuration diagram in relation to a configuration example of an exemplary embodiment.

Hereinafter, a description will be given of a preferable embodiment for realizing the exemplary embodiments of the present invention based on drawings. FIG. 1 is a conceptual module configuration diagram in relation to a configuration example according to the exemplary embodiment. The module indicates a component which may be logically separated in general, such as software (computer program) or hardware. Therefore, the module in the exemplary embodiment indicates not only a module in a computer program but also a module in a hardware configuration. For this reason, a description of the exemplary embodiment may also be a description of a computer program (a program which causes a computer to execute respective procedures, a program which causes a computer to function as the respective units, a program which causes a computer to realize respective functions), a system, and a method causing such a module to function. However, although terms such as "store" and "cause to store" and terms equivalent thereto are used for convenience of description, such terms mean "cause a storage device to store" or "control the storage device to store" when the exemplary embodiment relates to a computer program. In addition, a module has one-to-one correspondence with a function, or one module may be configured of one program, plural modules may be configured of one program, or in contrast, one module may be configured of plural programs when mounted. In addition, plural modules may be executed by one computer, or one module may be executed by plural computers in a dispersed or parallel environment. Moreover, one module may include another module. Hereinafter, a term "connection" is used even for logical connections (data exchange, instructions, reference relationships between data, and the like) as well as physical connections. A term "predetermined" means that a value or the like is defined prior to targeted processing, includes a meaning that the value or the like is defined before processing according to the exemplary embodiment is started, of course, and also includes a meaning that the value or the like is defined before targeted processing even after the processing according to the exemplary embodiment is started in accordance with a situation and a state at that time or in accordance with a situation and a state until that time. When there are plural "predetermined values", the predetermined values may be different values, or two or more values (including all the values, of course) may be the same. In addition, a description with a meaning of "when A is satisfied, then B is performed" is used as a meaning of "it is determined when A is satisfied, and when it is determined that A is satisfied, then B is performed". However, a case where it is not necessary to determine when A is satisfied is excluded.

In addition, a system or an apparatus includes a case where plural computers, hardware, apparatuses, or the like are connected with a communication unit such as a network (including one-to-one correspondence communication connection) and a case where the system or the apparatus is realized by one computer, hardware, apparatus, or the like. "Apparatus" and "system" are used as synonymous terms. It is a matter of course that the "system" does not include an artificial social "mechanism" (social system).

In addition, information as an object is read from a storage device every time each module performs processing or every time plural kinds of processing in a module are performed, and a processing result is written on the storage device after the processing. Therefore, descriptions of reading from the storage device before the processing and writing on the storage device after the processing are omitted in some cases. In addition, the storage device herein may include a hard disk, a Random Access Memory (RAM), an external storage medium, a storage device via a communication line, a register in a Central Processing Unit (CPU), or the like.

An information processing apparatus according to the exemplary embodiment reads an image from a recording medium 125 which records image data, compares the image data with the read data, and includes an image forming device 100 and an image processing device 150 as shown in the example of FIG. 1.

The image forming device 100 includes an image conversion module 110 and a recording module 120. The image processing device 150 includes a reading module 160, a variation region detection module 170, a comparison module 180, a mask processing module 190, and an output module 195. The image forming device 100 and the image processing device 150 may be respectively configured in separate housings or may be configured in a single housing. The image forming device 100 has a function as an output device such as a printer. The image processing device 150 has a function as an image reader such as a scanner.

Recording means printing by a printer, for example. The image data is data before being recorded in the recording medium 125 and indicates an image with no noise (defects). The read data is obtained by recording the image data in the recording medium 125 and reading the image in the recording medium 125 by the reading module 160, and therefore, noise occurs in the read data in some cases due to the recording processing by the recording module 120 or the reading processing by the reading module 160. Noise described herein means that an image which is not included in the image data is recorded in the recording medium 125, that the image which is included in the image data is not recorded in the recording medium 125, and that expansion and contraction, rotation, displacement, distortion, or the like occurs in the image data.

According to the exemplary embodiment, an output for determining whether or not noise has occurred due to the recording module 120 or the reading module 160 is performed by comparing the image data with the read data. When noise occurs, the recording module 120 and the reading module 160 are adjusted in order to reduce the noise. In general, there is a case where personal information or the like is included in the recording medium 125, and in such a case, it is not preferable for a person who determines occurrence of noise to view the personal information or the like.

The image conversion module 110 is connected to the recording module 120, and the variation region detection module 170, the comparison module 180, and the mask processing module 190 of the image processing device 150, receives print data 105, and delivers print images 115, which are image data, to the recording module 120, and the variation region detection module 170, the comparison module 180, and the mask processing module 190 of the image processing device 150. The image conversion module 110 converts the print data 105 into the print images 115. Specifically, the print data 105 in which images such as characters, figures, pictures, and the like are described is subjected to image conversion processing necessary for printing, such as rasterizing processing for bringing the print data 105 into a state where the print data 105 may be printed by the recording module 120 and conversion processing into a color space which may be reproduced by the recording module 120. The print data 105 is electronic data described in Portable Document Format (PDF), for example, and is created by document creating application software or the like. Each of the print images 115 may be any one of binary image data, gray image data, and color image data.

Particularly, the print data 105 includes plural document data items and includes the mutually same regions and different regions in forgoing and following document data items in a recording order. In this example, the same format is used in the plural document data items, and document data items including regions in which descriptions vary depending on document data items is regarded as the print data 105. For example, the print data 105 includes so-called variable data, which is an object of variable printing (VDP: Variable Data Printing or VIP: Variable Information Printing) as one mode of on-demand printing. Variable printing is performed such that different print contents such as images of texts, figures, pictures, and the like are printed in the same layout one by one on the print pages. For example, regions for describing names, product names, and breakdown of purchased goods in payment details of credit cards are different depending on documents while regions for describing titles, advertisements or the like common to customers are the same. The descriptions which are different in the respective documents are personal information or the like in the case of the variable data, and it is not preferable to include the personal information in an output result by the output module 195. The "personal information" described herein represents information with a risk that a specific person is identified. For example, a name, sex, an age, an address, a phone number, and the like are included therein. This is because the output result by the output module 195 is observed by a person who determines occurrence of noise. When the print data 105 is variable data, the print images 115 are image data generated from variable data. Then, plural print images 115 are generated from the print data 105 which is the variable data.

The recording module 120 is connected to the image conversion module 110, receives the print images 115 from the image conversion module 110, and outputs the recording medium 125. The recording module 120 records the print images 115 on a medium such as paper and outputs the recording medium 125. Specifically, the recording module 120 has a function as a printer. That is, the print images 115 are recorded on the recording medium 125.

The reading module 160 is connected to the variation region detection module 170, the comparison module 180, and the mask processing module 190 and delivers read images 165 to the variation region detection module 170, the comparison module 180, and the mask processing module 190. The reading module 160 reads the recording medium 125 (the medium on which the print image 115 is formed) output by the recording module 120 and generates the read images 165 which are read data. Specifically, the reading module 160 has a function as a scanner. That is, the reading module 160 converts the print images on the recording medium 125 into the read images 165 by photoelectric conversion or the like.

The comparison module 180 is connected to the image conversion module 110 of the image forming device 100, the reading module 160, and the mask processing module 190, receives the print images 115 from the image conversion module 110 and the read images 165 from the reading module 160, and delivers a comparison result 185 to the mask processing module 190. The comparison module 180 compares the print images 115, which are image data, with the read images 165, which are read data obtained by reading the recording medium 125 on which the images of the image data is formed. The aforementioned comparison processing for determining occurrence of noise is performed. For example, processing of generating a differential image of an exclusive OR (FOR) or the like between the print images 115 and the read images 165, processing of extracting images which are included in the print images 115 while not included in the read images 165, processing of extracting images which are not included in the print images 115 while included in the read images 165, or the like is performed.

The variation region detection module 170 is connected to the image conversion module 110 of the image forming device 100, the reading module 160, and the mask processing module 190, receives the print images 115 from the image conversion module 110, and delivers region information 175 to the mask processing module 190. In addition, the variation region detection module 170 may further receive the read images 165 from the reading module 160. The variation region detection module 170 acquires a variation region which varies in plural image data items or in plural read data items. "In plural image data items" means two or more print images 115 and means consecutive print images 115 in an output order of the recording module 120, for example. More specific examples thereof include foregoing and following two print images 115. "In plural read image data items" means two or more read images 165 and means consecutive print images 115 in the output order (which is the same as the reading order by the reading module 160) of the recording module 120, for example. More specific examples thereof include forgoing and following two read images 165. The variation region is a region to be presented in an invisible state, and a confidential region where personal information or the like is described.

For example, a region with a predetermined size, in which density of changed image is equal to or more than a predetermined value, may be extracted as a changed variation region by performing the same processing as that of the comparison module 180. This is because that there is high possibility that the variation (differential image) in the region where personal information or the like is described has higher density than that of the aforementioned noise.

In addition, the variation region detection module 170 may acquire a variation region in units of a region with the aforementioned predetermined size. This means that the variation region detection module 170 acquires the variation region, namely a region to be presented in the invisible state in units of a region corresponding to the sizes of characters or the like used in the image thereof, for example, in order to prevent a part of the image of personal information or the like from not being brought into the invisible state when it is difficult to distinguish the variation region from the comparison result. For example, a region surrounding the sizes of characters in the print images 115 may be regarded as the region with the predetermined size. This is because it is necessary to present the region in units of characters describing personal information or the like in the invisible state. In addition, a region with a size of a picture of a person in the print images 115 may be regarded as the region with the predetermined size, for example. This is because it is necessary to present the picture obtained by imaging a person in the invisible state. The sizes of characters and the size of a picture of a person may be predetermined values or may be determined by analyzing the print images 115 or the read images 165.

In addition, the variation region detection module 170 may generate the outside-variation-region image data configured of images other than the variation region by excluding the variation region obtained by the previous variation region detection module 170 from the print images 115. Then, the variation region detection module 170 acquires a variation region which varies between the outside-variation-region image data and the read images 165 or the print images 115 in the following processing after the outside-variation-region image data is generated. It is possible to expect improved precision in extracting the variation region compared to extraction of the variation region by detecting the variation region once. Alternatively, the size of a variation region which is temporarily acquired and position information may be used without any change, and the read images 165 obtained by excluding the variation region from a comparison object may be compared with image data obtained by excluding the variation region from the comparison object (or the outside-variation-region image data obtained by excluding the variation region from the comparison region) in the following processing.

The "following processing after the outside-variation-region image data is generated" indicates the following processing performed on the print images 115 or the read images 165 after the variation region detection module 170 generates the outside-variation-region image data when the variation region detection module 170 repeats processing on plural image data items, such as processing on variable data. Specifically, image data items A, B, and C as the print images 115 are present, a variation region between the image data items A and B is acquired, and image data configured of images other than the variation region (outside-variation-region image data) is generated. Then, the processing is performed in the next image data C by using the outside-variation-region image data.

Although the outside-variation-region image data is generated by the processing performed once in the specific example, the outside-variation-region image data may be generated by using plural results obtained by the variation region detection module 170. The usage of the plural results means generation of representative outside-variation-region image data by performing statistical processing (such as selection of a region where an average value, a mode, a median value, or an area is the smallest) on plural outside-variation-region image data items, for example.

Figure 8:
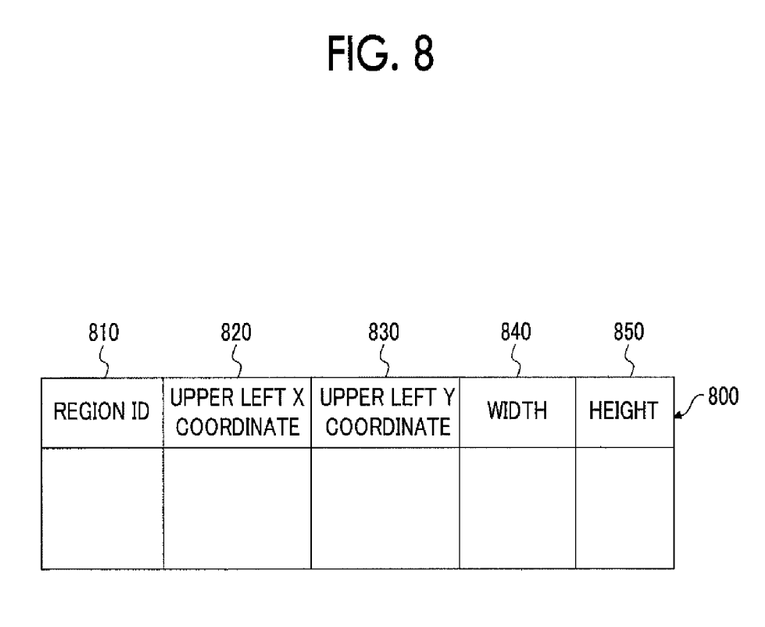
FIG. 8 is an explanatory diagram showing a data structure example in a region information table.

Examples of the region information 175 include a region information table 800. FIG. 8 is an explanatory diagram showing a data structure example of the region information table 800. The region information table 800 includes a region ID section 810, an upper left X-coordinate section 820, an upper left y-coordinate section 830, a width section 840, and a height section 850 and indicates the region information 175 to be presented in the invisible state in the print images 115 or the read images 165. The positions thereof in the print images 115 or the read images 165 are represented by using an XY coordinate system. In addition, the region has a rectangular shape. The region ID section 810 stores information (region ID: identification) for uniquely identifying the region according to the exemplary embodiment. The upper left X-coordinate section 820 stores an X coordinate of an upper left corner of the region. The upper left Y-coordinate section 830 stores a Y coordinate of an upper left corner of the region. The width section 840 stores a width of the region. The height section 850 stores a height of the region.

The mask processing module 190 is connected to the image conversion module 110 of the image forming device 100, the reading module 160, the variation region detection module 170, the comparison module 180, and the output module 195, receives the region information 175 from the variation region detection module 170, the comparison result 185 from the comparison module 180, and the read images 165 from the reading module 160, and delivers a processing result to the output module 195. By the mask processing by the mask processing module 190, a region which is designated by the region information 175 from the variation region detection module 170 in the comparison result 185 from the comparison module 180 is brought into the invisible state. In order to present the region designated by the region information 175 in the invisible state, the region is whited out or blacked out, for example. It is a matter of course that the region may be painted out with a color other than white and black. In addition, an image which is irrelevant to the image data or the read data as a comparison object may be attached thereto as the mask processing for obtaining the invisible state. Examples of the irrelevant image include a grid or striped pattern image and an image with a mark or a character indicating that the image is invisible.

Furthermore, the mask processing module 190 may bring the region designated by the region information 175 in any one of or both the read images 165 and the print images 115 into the invisible state. This is for presenting personal information or the like in the invisible state even when the comparison result 185 is superimposed on (or aligned with) any one of or both the read images 165 and the print images 115 and output, for example.

The output module 195 is connected with the mask processing module 190 and receives the processing result of the mask processing module 190. The output module 195 outputs an image of the comparison result 185 which is obtained by the mask processing module 190 bringing the region designated by the region information 175 into the invisible state. Here, the output of the image of the comparison result 185 includes printing by a print apparatus such as a printer, display on a display apparatus such as a display, transmission of the image by an image transmission apparatus such as a facsimile, writing of the image in an image storage device such as an image database, storage on a storage medium such as a memory card, and delivery to another information processing apparatus, for example.

Figure 2:
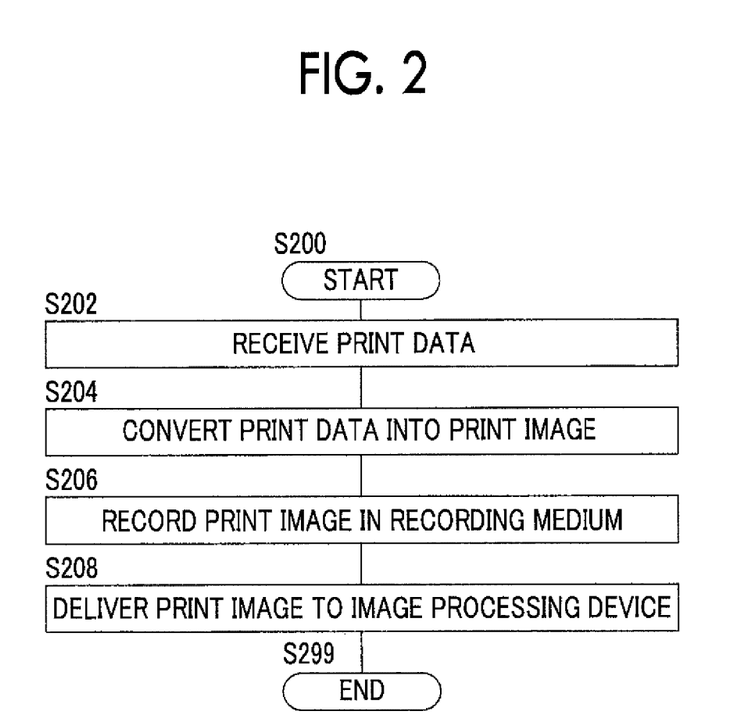
FIG. 2 is a flowchart showing a processing example according to the exemplary embodiment.

FIG. 2 is a flowchart showing a processing example according to the exemplary embodiment (image forming device 100).

Figure 4:
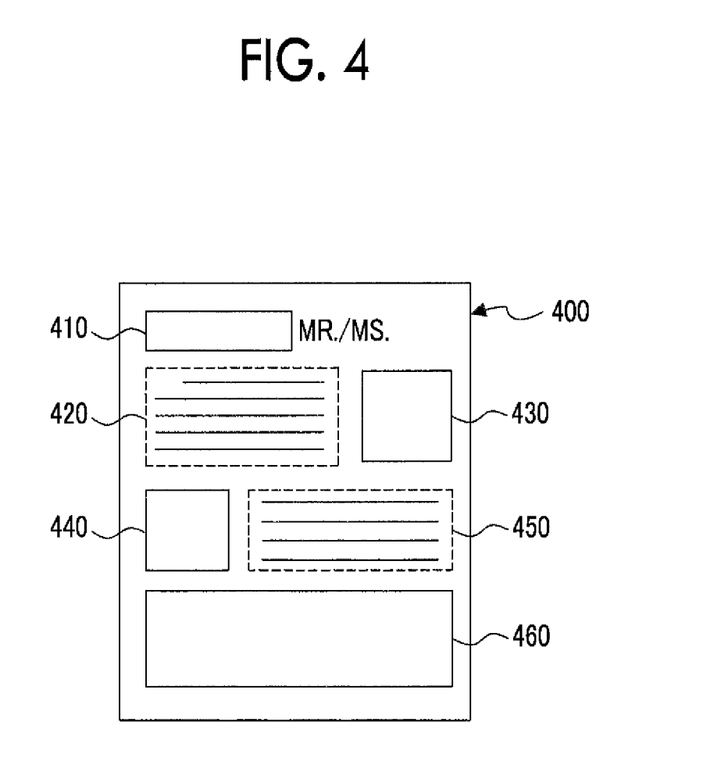
FIG. 4 is an explanatory diagram showing an example of image data (form) as an object of the exemplary embodiment.

In Step S202, the image conversion module 110 receives the print data 105. For example, a case where the print data 105 is variable data and a document for each individual is printed by using a form document 400 will be described. FIG. 4 is an explanatory diagram showing an example of the image data (form) as an object of the exemplary embodiment. The form document 400 includes a name region 410, a fixed phrase region 420, a portrait photograph region 430, a fixed figure region 440, a fixed phrase region 450, and a personal information region 460. The regions to be represented in the invisible state are the name region 410, the portrait photograph region 430, and the personal information region 460. Information of each individual (a name, a head-shot, and the like) is described in the name region 410, the portrait photograph region 430, and the personal information region 460.

Figure 5A:
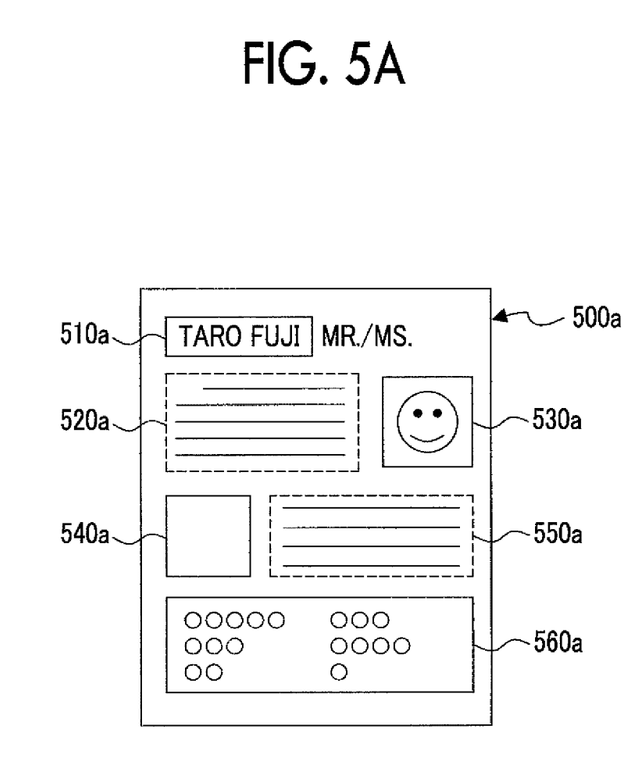
FIGS. 5A and 5B are explanatory diagrams showing examples of image data and read data as objects of the exemplary embodiment.
Figure 5B:
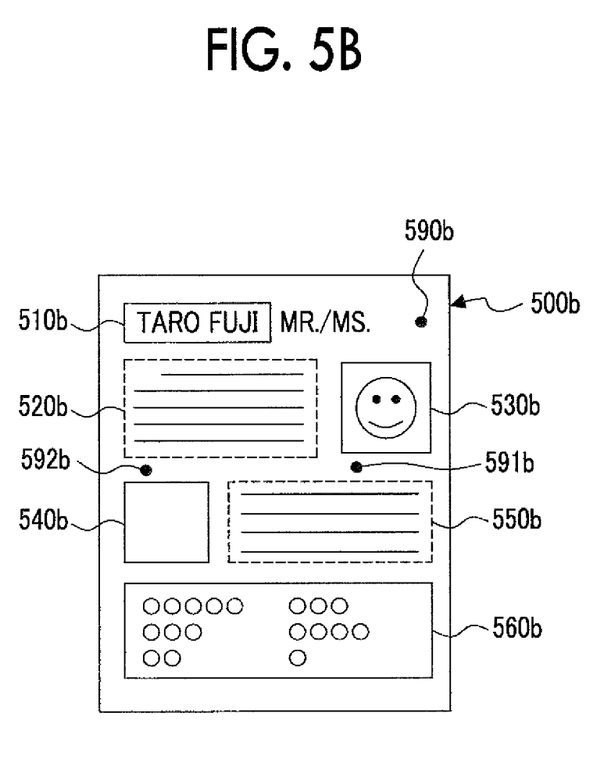

In Step S204, the image conversion module 110 converts the print data 105 into the print images 115. In such a case, plural print images 115 are generated from the print data 105. FIGS. 5A and 53 are explanatory diagrams showing examples of image data and read data as objects of the exemplary embodiment. Image data 500*a* shown in the example of FIG. 5A represents the print image 115 in a state where the form document 400 is filled in with personal information of a specific individual. A name region 510*a*, a portrait photograph region 530*a*, and a personal information region 560*a* are filled in with the personal information. It is a matter of course that there is no noise in the image data 500*a* in this state.

In Step S206, the recording module 120 records the print image 115 on the recording medium 125 such as a paper. Read data 500*b* shown in the example of FIG. 53 is an image obtained as a result of printing the image data 500*a* shown in the example of FIG. 5A. Here, noise 590*b*, noise 591*b*, and noise 592*b* are caused.

In Step S208, the image conversion module 110 delivers the print image 115 to the image processing device 150. For example, the image conversion module 110 may deliver the print image 115 via a communication line or causes a memory or the like to store the print image 115 and deliver the print image 115.

Figure 3:
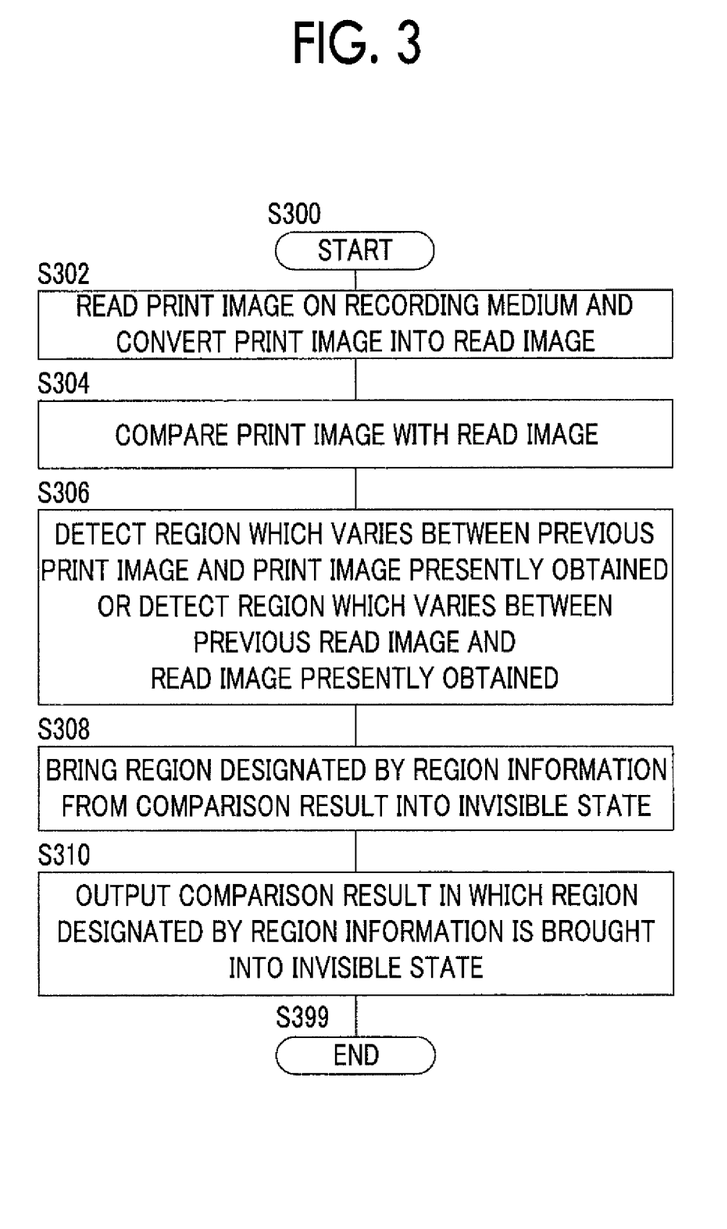
FIG. 3 is a flowchart showing a processing example according to the exemplary embodiment.

FIG. 3 is a flowchart showing a processing example according to the exemplary embodiment (image processing device 150).

In Step S302, the reading module 160 reads a print image in the recording medium 125, which is output by the recording module 120, and converts the print image into the read image 165.

In Step S304, the comparison module 180 compares the print image 115 with the read image 165. For example, the image data 500*a* shown in the example of FIG. 5A is compared with the read data 500*b* shown in the example of FIG. 5B. In doing so, it is possible to extract the noise 590*b*, the noise 591*b*, and the noise 592*b*.

Figure 6A:
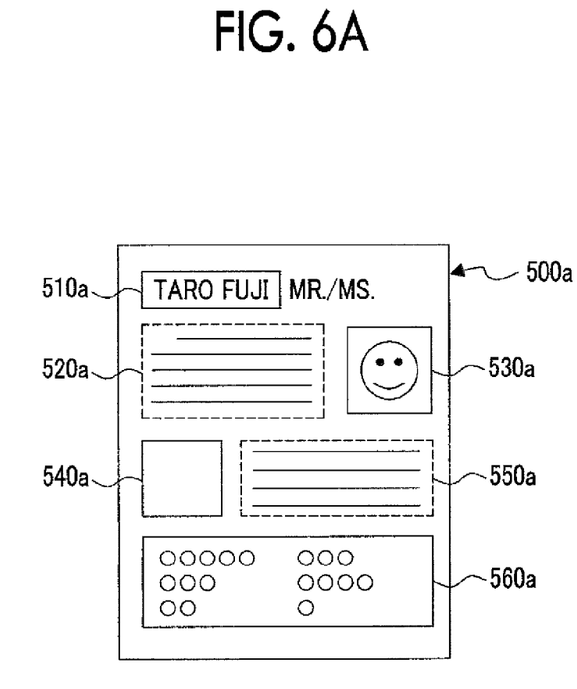
FIGS. 6A and 6B are explanatory diagrams showing processing examples according to the exemplary embodiment.
Figure 6B:
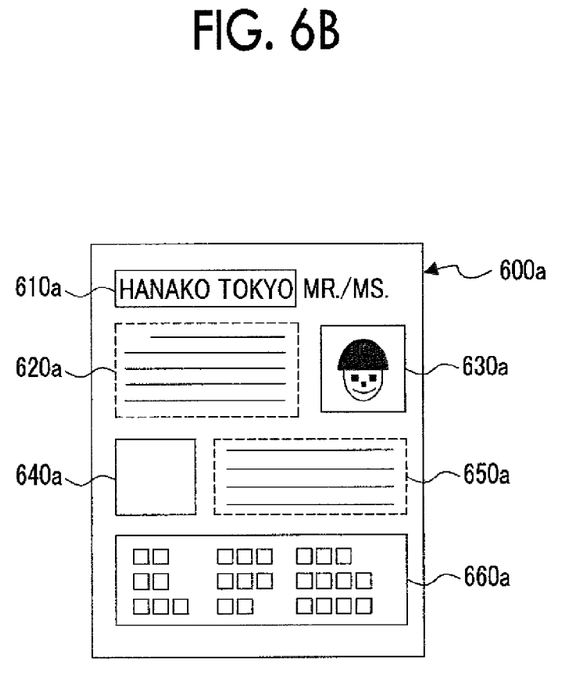
Figure 7A:
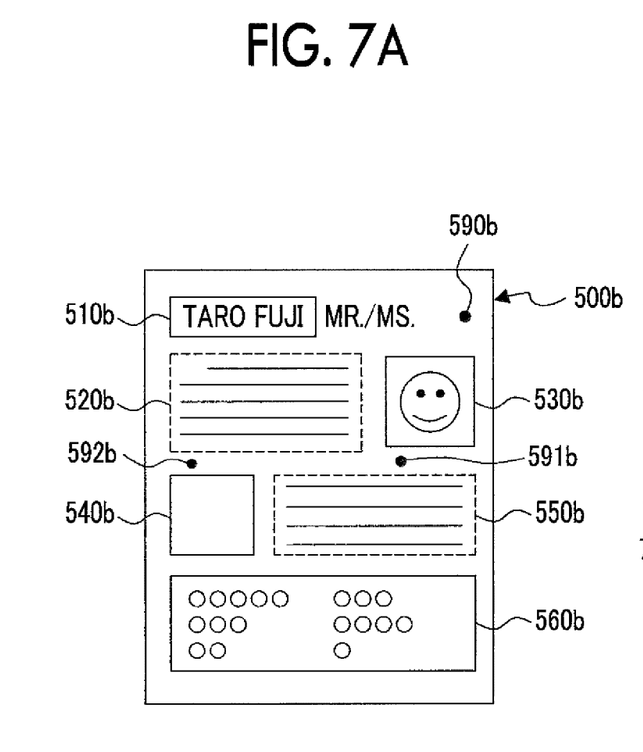
FIGS. 7A and 7B are explanatory diagrams showing processing examples according to the exemplary embodiment.
Figure 7B:
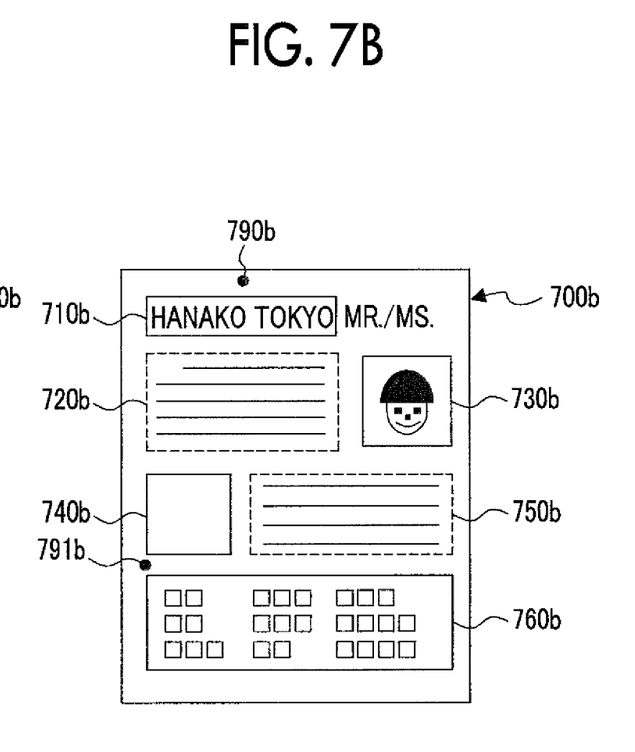

In Step S306, the variation region detection module 170 detects a region which varies between the previous print image 115 and the print image 115 presently acquired, or a region which varies between the previous read image 165 and the read image 165 presently acquired. For example, image data 600*a* shown in the example of FIG. 6B is an example of the previous print image 115, and the image data 500*a* shown in the example of FIG. 6A is an example of the print image 115 presently acquired. Variation regions between the image data 500*a* and the image data 600*a* are detected. Here, the name region 510*a* (name region 610*a*), the portrait photograph region 530*a* (portrait photograph region 630*a*), and the personal information region 560*a* (personal information region 660*a*) are detected as variation regions. Alternatively, read data 700*b* shown in the example of FIG. 7B is an example of the previous read image 165, and the read data 500*b* shown in the example of FIG. 7A is an example of the read image 165 presently acquired. Variation regions between the read data 500*b* and the read data 700*b* are detected. Here, a name region 510*b* (name region 710*b*), a portrait photograph region 530*b* (portrait photograph region 730*b*), and a personal information region 560*b* (personal information region 760*b*) are detected as the variation regions. The information of such variation regions are stored on the region information table 800 shown in the example of FIG. 8. Although the noise 590*b*, the noise 591*b*, the noise 592*b*, noise 790*b*, and noise 791*b* are also present as differences in the case of the example in FIGS. 7A and 7B, density of such regions is less than the predetermined value, and therefore, the noise 590*b*, the noise 591*b*, the noise 592*b*, the noise 790*b*, and the noise 791*b* are not detected as variation regions.

Figure 9:
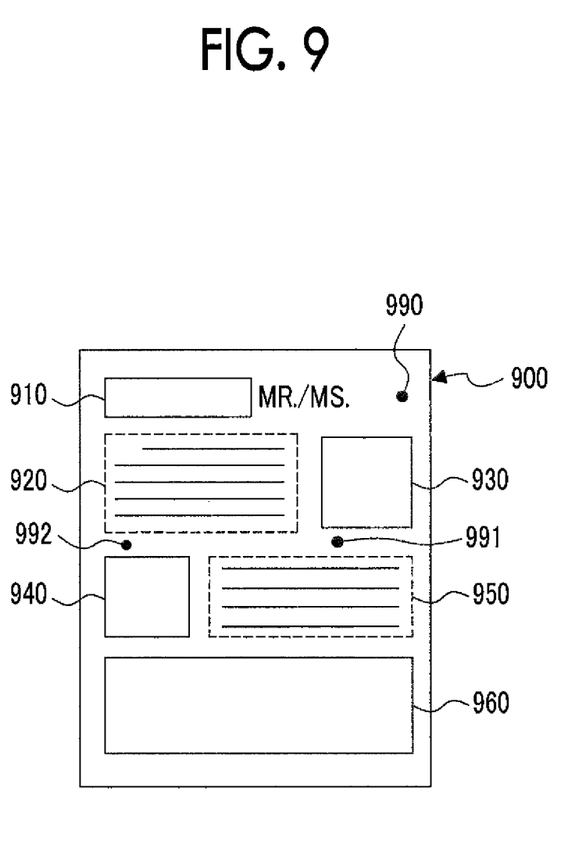
FIG. 9 is an explanatory diagram showing a processing example according to the exemplary embodiment.

In Step S308, the mask processing module 190 brings the regions designated by the region information 175 in the comparison result 185 into the invisible state. FIG. 9 is an explanatory diagram showing a processing example in Step S308 according to the exemplary embodiment. The states of expression of noise 990, noise 991, and noise 992 as the comparison result 185 are changed by bringing a name region 910, a portrait photograph region 930, and a personal information region 960 within an output image 900 into the invisible state (blank, in this example) in accordance with the region information 175 in the region information table 800. The states of expression may be changed in a manner in which an observer of the output image 900 may easily notice the change, and for example, the color thereof may be changed, rectangular shapes or the like surrounding the regions may be added, or the regions may be flashed by flash or the like.

In Step S310, the output module 195 outputs the comparison result 185 in which the regions designated by the region information 175 are brought into the invisible state.

Figure 10:
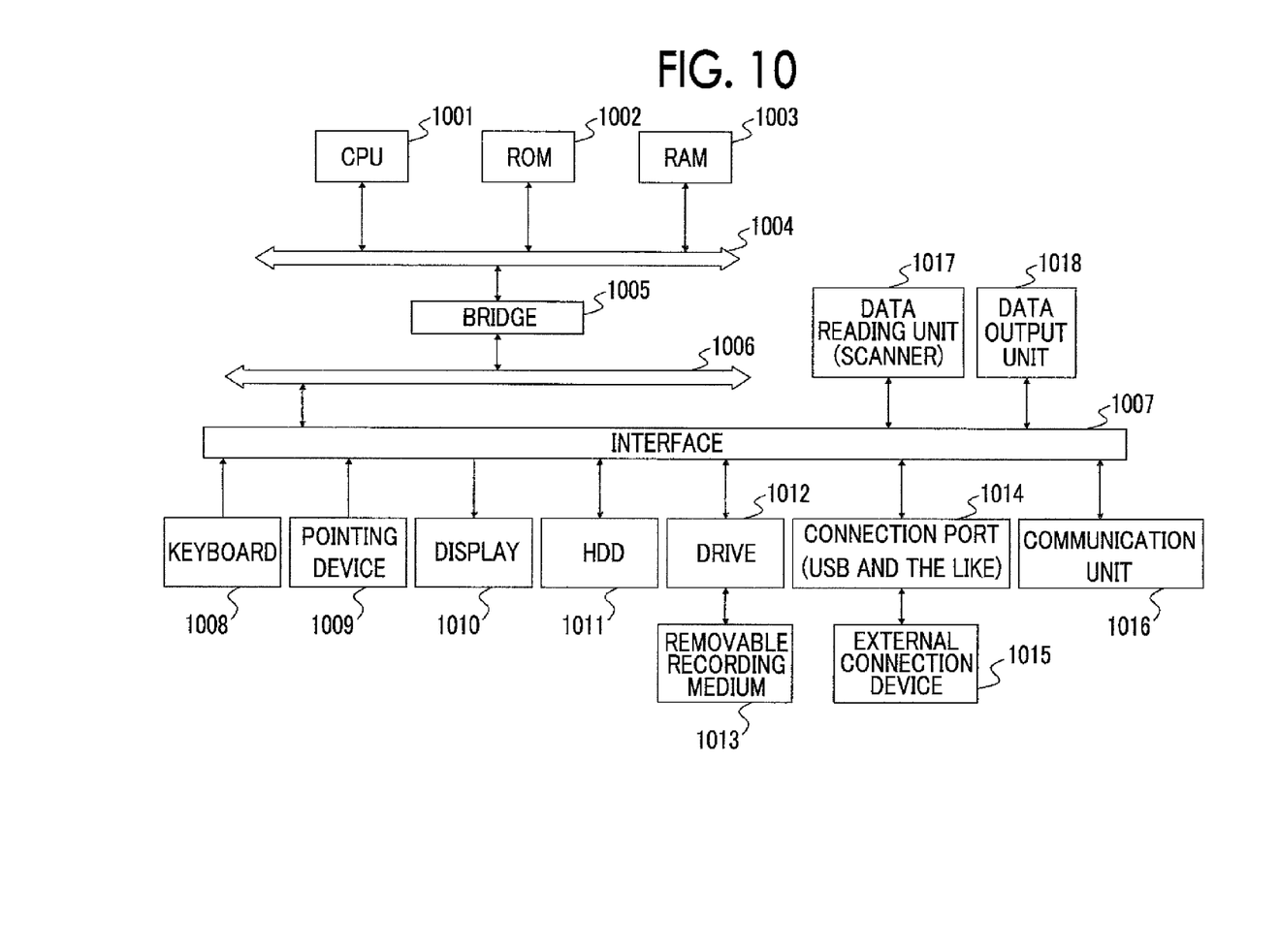
FIG. 10 is a block diagram showing a hardware configuration example of a computer which realizes the exemplary embodiment.

Referring to FIG. 10, a description will be given of a hardware configuration example of the information processing apparatus (any one of or both the image forming device 100 and the image processing device 150) according to the exemplary embodiment. The configuration shown in FIG. 10 is configured of a Personal Computer (PC), for example, and the drawing shows a hardware configuration example provided with a data reading unit 1017 such as a scanner and a data output unit 1018 such as a printer.

A Central Processing Unit (CPU) 1001 is a control unit which executes processing in accordance with the computer program describing sequences executed by the respective modules described in the aforementioned exemplary embodiment, namely the image conversion module 110, the recording module 120, the reading module 160, the variation region detection module 170, the comparison module 180, the mask processing module 190, the output module 195 and the like.

A Read Only Memory (ROM) 1002 stores programs, computation parameters, and the like used by the CPU 1001. A Random Access Memory (RAM) 1003 stores programs executed by the CPU 1001 and parameters and the like which appropriately vary in the execution thereof. Such components are connected to each other by a host bus 1004 configured of a CPU bus or the like.

The host bus 1004 is connected to an external bus 1006 such as a Peripheral Component Interconnect/Interface (PCI) bus via a bridge 1005.

A pointing device 1009 such as a keyboard 1008 and a mouse is an input device operated by the operator. A display 1010 is configured of a liquid crystal display device, a Cathode Ray Tube (CRT), or the like and displays various kinds of information as texts or image information.

A Hard Disk Drive (HDD) 1011 is provided with a built-in hard disk, drives the hard disk, and causes the hard disk to record or reproduce programs or information executed by the CPU 1001. The hard disk stores the print data 105, the print images 115, the read images 165, the region information 175, the comparison result 185, and the like. Furthermore, various computer programs such as other various data processing programs are stored thereon.

A drive 1012 reads data or a program recorded in a mounted removable recording medium 1013 such as a magnetic disk, an optical disc, a magnetooptical disc, or a semiconductor memory and supplies the data or the program to the RAM 1003 connected via an interface 1007, the external bus 1006, the bridge 1005, and the host bus 1004. The removable recording medium 1013 may also be used as a data recording region similar to the hard disk.

A connection port 1014 is a port for connecting an external connection device 1015 and includes connection units for a USE, an IEEE 1394, and the like. The connection port 1014 is connected to the CPU 1001 and the like via the interface 1007, the external bus 1006, the bridge 1005, the host bus 1004, and the like. A communication unit 1016 is connected to a communication line and executes data communication processing with the outside. The data reading unit 1017 is a scanner, for example, and executes document reading processing. The data output unit 1018 is a printer, for example, and executes document data output processing.

In addition, the hardware configuration of the information processing apparatus shown in FIG. 10 is one configuration example, and the exemplary embodiment is not limited to the configuration shown in FIG. 10 and may be any configuration as long as the modules described in the exemplary embodiment may be executed. For example, a part of the modules may be configured of dedicated hardware (such as an Application Specific Integrated Circuit (ASIC)), another part of the modules may be in an external system which is connected via a communication line, and further, plural systems shown in FIG. 10 may be connected to each other via a communication line so as to cooperate together. In addition, the modules may be embedded in a copy machine, a facsimile, a scanner, a printer, a multifunction machine (an image processing apparatus provided with two or more functions among functions of a scanner, a printer, a copy machine, a facsimile, and the like), and the like.

In addition, terms "equal to or more than", "equal to or less than", "more than", and "less than" used in the comparison with the predetermined values in the description of the aforementioned exemplary embodiment may be understood as "more than", "less than", "equal to or more than", and "equal to or less than", respectively, as long as no inconsistency occurs in the combinations thereof.

In addition, the program described above may be stored on a recording medium and provided, or may be provided by a communication unit. In such a case, the program as described above may be understood as an invention of a "computer-readable recording medium which records the program therein".

The "computer-readable recording medium which records the program therein" means a computer readable recording medium which is used for installing, executing, and distributing the program and records the program therein.

In addition, examples of the recording medium include digital versatile discs (DVDs) such as "a DVD-R, a DVD-RW, and a DVD-RAM" which are standards defined by DVD Forum and "a DVD-+R and a DVD+RW" which are standards defined by DVD+RW, compact discs (CDs) such as a read only memory (CD-ROM), a CD recordable (CD-R), and a CD rewritable (CD-RW), a Blu-ray (registered trademark) disc, a Magnetooptical Disc (MO), a Flexible Disc (FD), a magnetic tape, a hard disk, a Read Only Memory (ROM), an Electrically Erasable Programmable Read-Only Memory (EEPROM (registered trademark)) a flash memory, a Random Access Memory (RAM), and a Secure Digital (SD) memory card.

Moreover, the aforementioned program or a part thereof may be saved or distributed by being recorded in the recording medium. In addition, the program may be communicated and transmitted by using a transmitting medium such as a wired network, a wireless communication network, or a combination thereof used in a Local Area Network (LAN), a Metropolitan Area Network (MAN), a Wide Area Network (WAN), the Internet, an intranet, an extranet, or the like, or may be transported on a carrier wave.

Furthermore, the aforementioned program may be a part of another program or may be recorded in the recording medium with a different program. Alternatively, the program may be divided and recorded in plural recording media. In addition, the program may be recorded in any state such as a compressed state or a coded state as long as the program may be recovered.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a comparison unit that compares image data with read data obtained by reading a medium on which an image of the image data is recorded, wherein the image data is data that exists prior to being recorded on the medium;
an acquisition unit that acquires a variation region that varies in a plurality of image data items or in a plurality of read data items; and
an output unit that outputs a comparison result of the comparison unit such that the variation region is in an invisible state.

2. The information processing apparatus according to claim 1,
wherein the acquisition unit acquires the variation region in units of regions with predetermined sizes.

3. The information processing apparatus according to claim 2,
wherein the acquisition unit acquires the variation region in units of regions surrounding sizes of characters in the image data or the read data.

4. The information processing apparatus according to claim 2,
wherein the acquisition unit acquires the variation region in units of regions surrounding sizes of pictures in the image data or the read data.

5. The information processing apparatus according to claim 2, further comprising:
a generation unit that generates outside-variation-region image data configured of images other than the variation region by excluding the variation regions acquired by the acquisition unit from the image data,
wherein the acquisition unit acquires a variation region that varies between the outside-variation-region image data and the read data or the image data in following processing after the outside-variation-region image data is generated by the generation unit.

6. The information processing apparatus according to claim 1,
wherein the acquisition unit acquires the variation region which varies in a plurality of image data that is consecutively output.

7. The information processing apparatus according to claim 1,
wherein the acquisition unit acquires the variation region which varies in a plurality of read data that is consecutively read.

8. The information processing apparatus according to claim 1,
wherein the output unit brings the variation region into the invisible state by painting out the variation region with a single color.

9. The information processing apparatus according to claim 1, further comprising:
a generation unit that generates outside-variation-region image data configured of images other than the variation region by excluding the variation region acquired by the acquisition unit from the image data,
wherein the acquisition unit acquires a variation region that varies between the outside-variation-region image data and the read data or the image data in following processing after the outside-variation-region image data is generated by the generation unit.

10. The information processing apparatus according to claim 1,
wherein the output unit that outputs the comparison result such that a state of expression of the comparison result is changed.

11. A non-transitory computer readable medium storing an information processing program causing a computer to function as:
a comparison unit that compares image data with read data obtained by reading a medium on which an image of the image data is formed wherein the image data is data that exists prior to being recorded on the medium;
an acquisition unit that acquires a variation region that varies in a plurality of image data items or in a plurality of read data items; and
an output unit that outputs a comparison result of the comparison unit such that the variation region is in an invisible state.

* * * * *